March 17, 1964

A. H. WILLINGER 3,125,065

AQUARIUM HOOD

Filed Dec. 11, 1961

INVENTOR.
ALLAN H. WILLINGER

BY
Friedman & Goodman
ATTORNEYS

March 17, 1964 A. H. WILLINGER 3,125,065
AQUARIUM HOOD
Filed Dec. 11, 1961 3 Sheets-Sheet 2
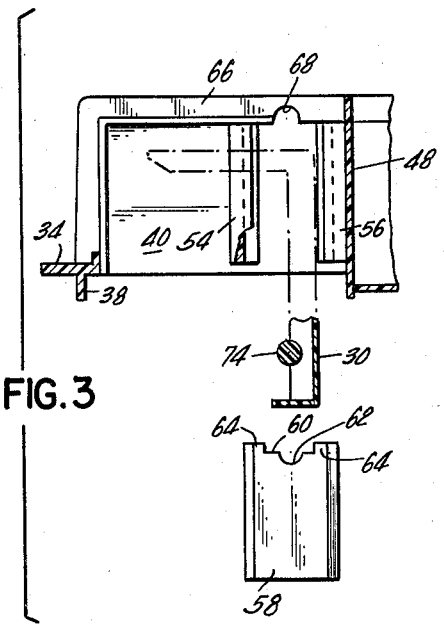
FIG. 3
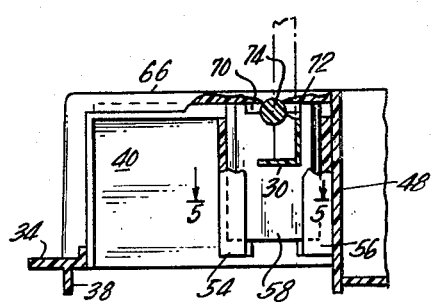
FIG. 4
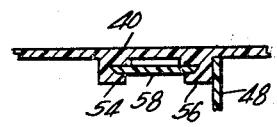
FIG. 5
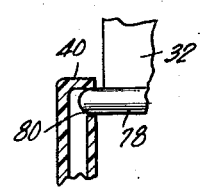
FIG. 6
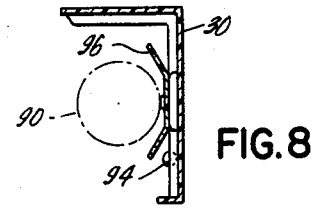
FIG. 8
FIG. 7
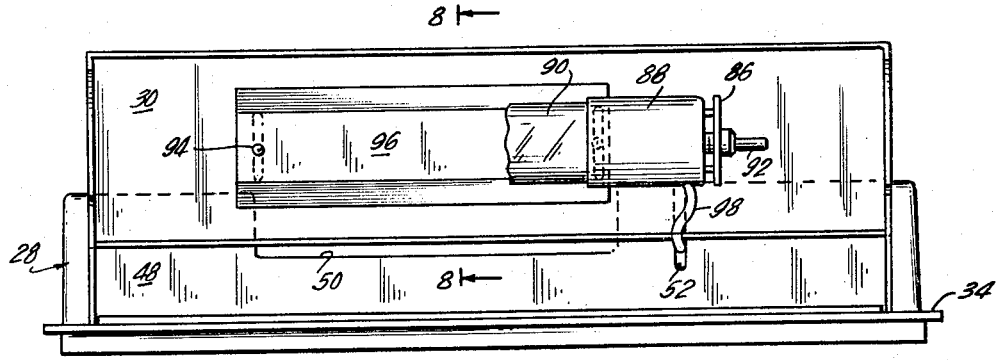
INVENTOR.
ALLAN H. WILLINGER
BY
Friedman & Goodman
ATTORNEYS March 17, 1964 A. H. WILLINGER 3,125,065
AQUARIUM HOOD
Filed Dec. 11, 1961 3 Sheets-Sheet 3

INVENTOR.
ALLAN H. WILLINGER
BY
Friedman & Goodman
ATTORNEYS

United States Patent Office 3,125,065
Patented Mar. 17, 1964

3,125,065
AQUARIUM HOOD
Allan H. Willinger, New Rochelle, N.Y., assignor to Aquariums Incorporated, Maywood, N.J., a corporation of Delaware
Filed Dec. 11, 1961, Ser. No. 158,445
4 Claims. (Cl. 119—5)

The present invention relates in general to aquariums and, in particular, to hoods therefor.

It is an object of the present invention to provide a cover or hood for an aquarium, which hood also constitutes a mount and reflector for a light source and which is provided with means to receive and support various utilities utilized in connection with the aquarium.

It is a further object of the present invention to provide an aquarium hood of the described type which can be readily manufactured from inexpensive materials, which is economical in operation, and which can be sold at a relatively low price.

It is a further object of the present invention to provide a cover for the open top of an aquarium so as to prevent undue evaporation of the water therein and also to prevent the fish from jumping out of the aquarium, said cover having easy access for feeding the fish and cleaning the aquarium and also for storing utilities utilized in connection with operation of the aquarium.

Other and further objects and advantages of the present invention will be readily apparent to one skilled in the art from a consideration of the following specification taken in connection with the appended drawings.

In the drawings, which illustrate the best mode presently contemplated for carrying out the invention:

FIGURE 3 is a fragmentary view similar to FIGURE 4 and showing the portions thereof in exploded condition;

FIGURE 4 is a fragmentary detail view in elevation of a portion of FIGURE 2;

FIGURE 5 is a fragmentary sectional view on an enlarged scale taken on the line 5—5 of FIGURE 4;

FIGURE 6 is a fragmentary sectional view taken on the line 6—6 of FIGURE 2;

FIGURE 7 is a front elevational view of the hood taken in the direction of arrow 7 in FIGURE 1 and the front cover of the hood being shown in the open or raised condition thereof;

FIGURE 8 is a sectional view taken on the line 8—8 of FIGURE 7;

Figure 1:
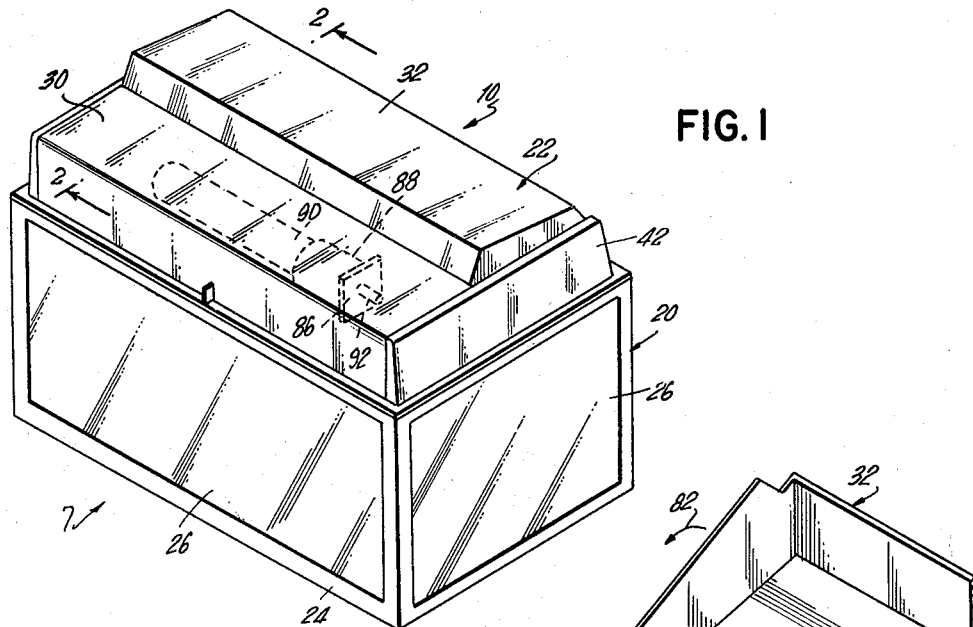
FIGURE 1 is a perspective view of an aquarium provided with a hood or cover pursuant to the present invention.

Referring now to the drawings in detail, there is shown an aquarium 20 provided with a hood 22 pursuant to the present invention. As here shown, the aquarium 20 is of conventional construction, being provided with a suitable frame 24, preferably formed of suitable metallic material and provided with transparent, preferably glass inserts 26, which form the front and side walls thereof. The aquarium 20 is provided with an open top which is closed or covered by the hood 22 of the present invention.

As here shown, the hood 22 is formed of a base or support member 28 provided with a front hinged cover 30 and with a rear hinged cover 32.

Figure 11:
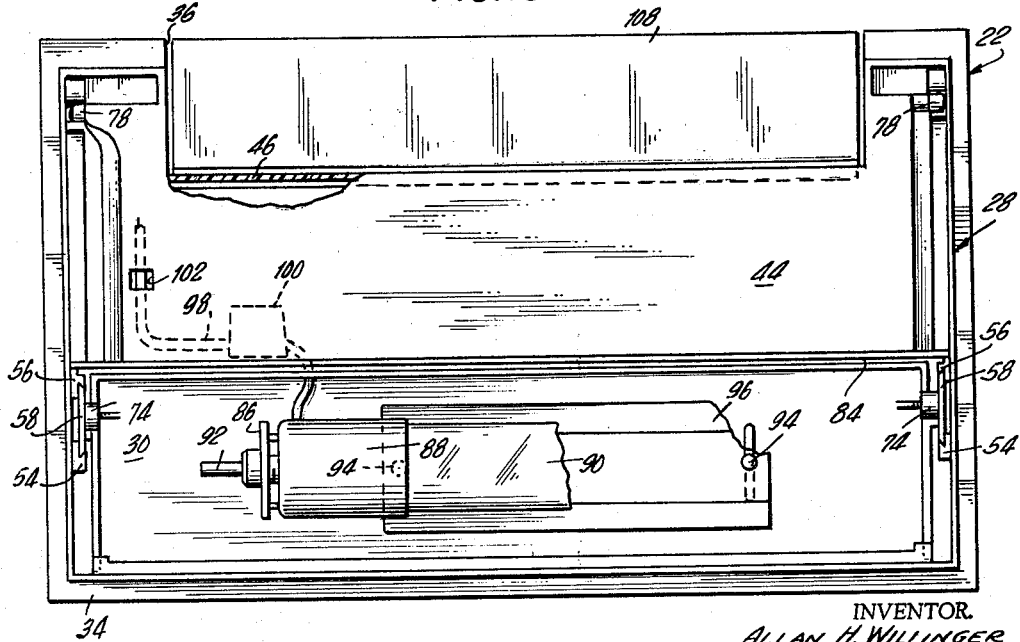
FIGURE 11 is a bottom plan view, on an enlarged scale, of the hood with portions broken away for purposes of illustration.

The base member 28 is an integral unit which is preferably molded from a suitable plastic material. As here shown, the base member 28 is provided with a bottom peripheral flange 34 which is continuous about the base member 28 except for a rear cutout 36 defined in the base member, as best shown in FIGURE 11. The flange 34 is provided with a depending detent 38 which is adapted to engage the upper inner surface of the aquarium frame 24 when the flange 34 is seated on the upper edge of the aquarium frame as best shown in FIGURE 2, so as to removably retain the hood 22 in position at the upper open end of the aquarium 20.

Figure 10:
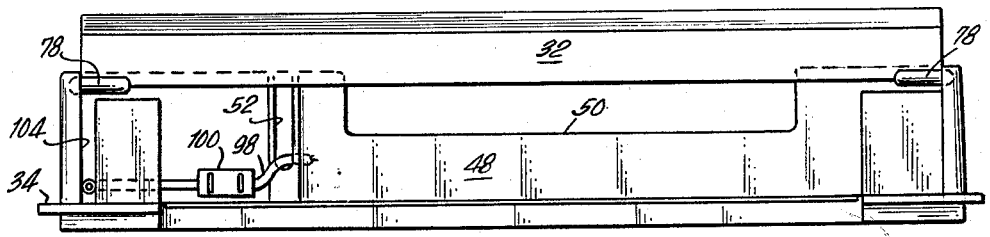
FIGURE 10 is a rear elevational view, on an enlarged scale, of the hood taken in the direction of the arrow 10 in FIGURE 1.

The base member 28 is provided with opposing end walls 40 and 42 and with a horizontal portion or shelf 44, which interconnects the end walls. The shelf 44 is provided along one marginal edge thereof with an upstanding rim 46, the function of which will presently appear, and with an upwardly extending interior wall 48. As best shown in FIGURE 10, the wall 48 is provided with a central cutout 50 and with a vertical open slot 52, the functions of which will presently appear.

The previously mentioned hinged covers 30 and 32 are mounted by the end walls 40 and 42. More specifically and as best shown in FIGURES 3, 4 and 5, each of the end walls is provided at the inner surface thereof forwardly of the interior wall 48 with a pair of integral tracks or guideway defining portions 54 and 56, which are adapted to slidably receive a panel insert or retainer 58. At the upper end thereof, each insert or retainer 58 is provided with a cutout 60 which defines a central semi-circular recess 62 and a pair of laterally spaced tabs or projections 64. Forwardly of the interior wall 48, each of the end walls is provided with an upper internal or interior or inner surface rim portion 66 in which there is defined a semi-circular cutout 68 having outwardly extending detent portions 70 and 72. The front cover 30 is provided with a pair of oppositely disposed laterally extending pivot portions or pivot tabs or pins 74, which are adapted to engage in the semi-circular cutouts 68 defined in the end walls 40 and 42 respectively and are releasably retained therein by means of the inserts 58. More specifically, when the inserts 58 are fully inserted in position in the tracks 54 and 56, as best shown in FIGURE 4, the tabs or ears 64 of the inserts are in snap engagement with the detent portions 70 and 72 respectively so that the semi-circular recess 62 in each of the inserts 58 is in opposition to the semi-circular cutout 68 defined in the associated end wall so as to define therewith a circular pivot opening for the associated pivot pin 74 whereby the front cover 30 is mounted for movement to and from the open position thereof shown in FIGURE 2, and a closed position thereof shown in FIGURE 1, as indicated by the arrow 76 in FIGURE 2. The inserts 58 are secured in position by means of a suitable adhesive or cement. In order to mount the rear or hinged cover 32, the latter is provided with a pair of laterally extending pivot pin portions 78. In order to accommodate said pivot pins 78, the end walls 40 and 42 are provided at their rear end marginal portions rearwardly of the interior wall 48 with complementary pivot openings 80, as best shown in FIGURE 6. It will be understood that the plastic material from which the base member 28 is fabricated has sufficient resiliency to permit for the spreading apart of the end walls sufficiently to allow for the insertion of the pivot pins 78 of the rear cover 32 into the complementary openings 80. When the rear cover 32 is so mounted, it can then be moved to and from the open condition thereof shown in FIGURE 2 to the closed condition thereof shown in FIGURE 1, as indicated by the arrow 82. In view of the foregoing, it will be readily apparent that each of the covers 30 and 32 which are molded from suitable plastic materials, are mounted on the base member 28 for hinged or pivoted movement to and from open and closed positions thereof.

Figure 2:
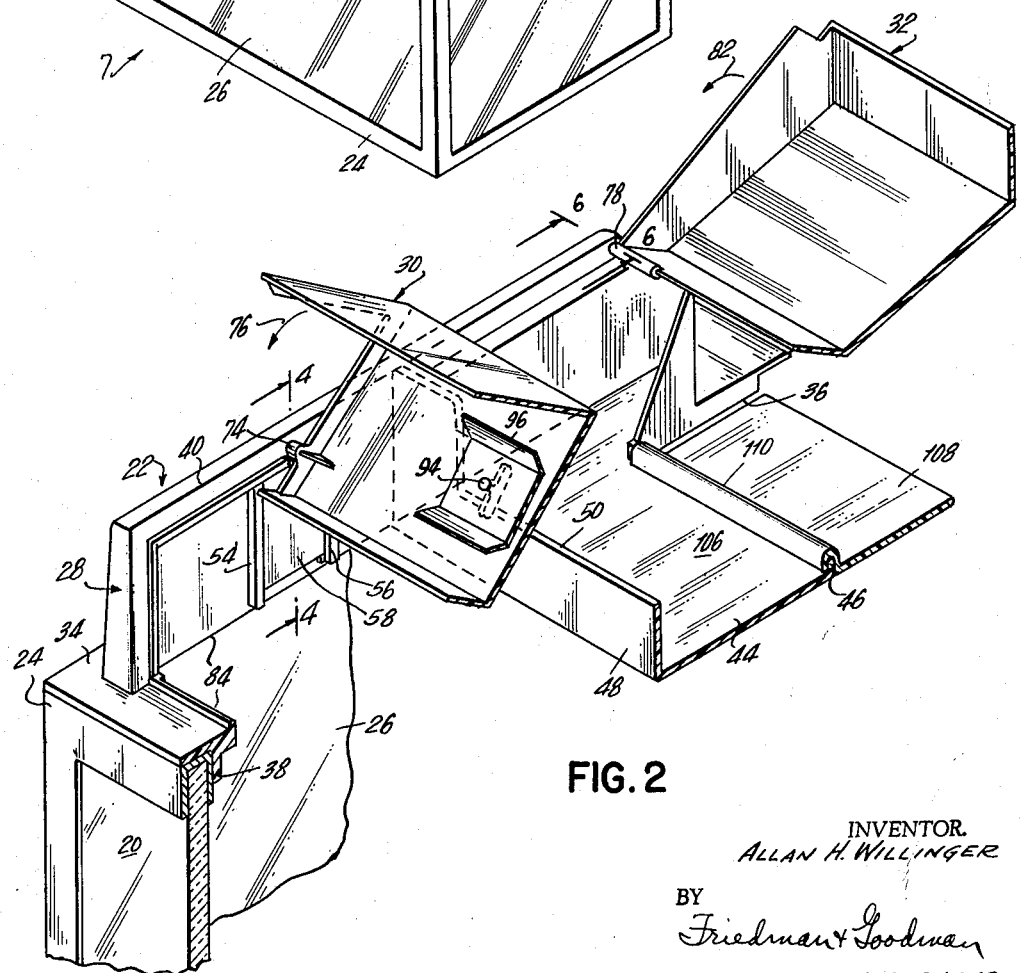
FIGURE 2 is a sectional view on an enlarged scale taken on the line 2—2 of FIGURE 1 with two hinged portions of the hood being illustrated in the open condition thereof.
Figure 9:
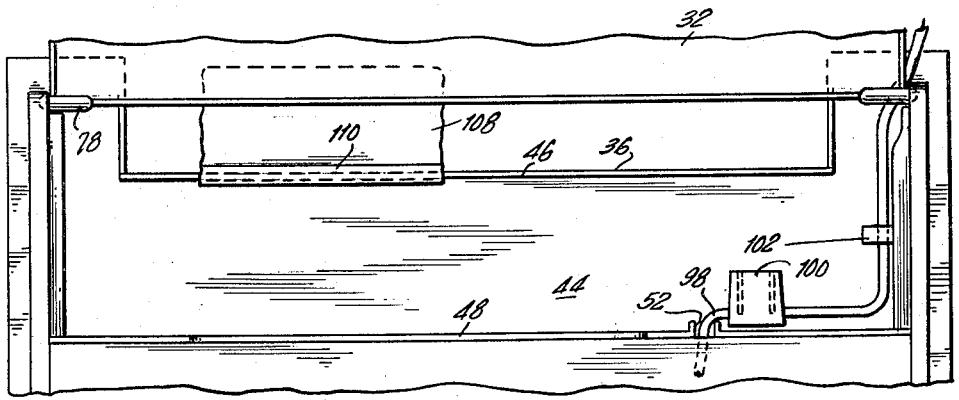
FIGURE 9 is a fragmentary top plan view, on an enlarged scale, of the hood with the rear cover thereof being shown in the open condition thereof.

As best shown in FIGURE 2, the shelf 44 formed in the base member 28 defines the previously identified rear cutout 36 which is open along one side thereof and a front cutout 84 which is completely enclosed at all sides thereof, it being noted from FIGURE 11 that the front cover 30 overlies the front cutout 84 in the closed position of the cover. The front cutout or opening 84 defines an access opening to the interior of the aquarium 20 when the hood 22 is in position thereon whereby access may be readily had to the contents of the aquarium. At the inner surface thereof, the front cover 30 is provided with an integral bracket 86 on which there is mounted a socket 88 for a light bulb 90. The socket 88 is of conventional construction and is provided with a conventional manually operable light switch 92. The cover 30 is provided also at its inner surface with detents 94 which mount a reflector 96 for the light bulb, so that when the cover is in its closed position, the light from the bulb 90 may shine directly into and also be reflected by the reflector 96 into the aquarium 20. The electric wire 98 for the electric socket 88 passes through the previously mentioned open slot 52 defined in the interior wall 48 to an electric plug 100 which overlies the shelf 44. The wire passes beneath an integral detent portion 102 formed on the shelf 44 and out through an opening 104 defined in the base member 28, as best shown in FIGURE 10.

It will be noted that the previously mentioned cutout 50 in the internal wall 48 permits for the passage of the light from the electric bulb 90 through the wall 48 so as to light up the shelf 44 and any equipment which may be mounted thereon. It will be understood that the wall 48, the shelf 44, the associated portions of the end walls 40 and 42 and the rear cover 32 define a storage compartment 106 (FIGURE 2) which may be used for storing aquarium accessories such as, for example and not by way of limitation, nets and food. In addition, the electrical plug or receptacle 100, which is provided in said storage compartment 106, may be used to supply power to a thermostat heater or to an air pump.

Pursuant to an important aspect of the present invention, provision is made to accommodate a pump hanger or a gang valve. In this connection, provision is made for a plastic insert 108 which is adapted to overlie the previously mentioned rear cutout 36. More specifically and as best shown in FIGURE 2, the plastic insert 108 is provided along one marginal edge thereof with a channel defining portion 110 which is adapted to releasably engage the previously mentioned rim 46. As previously indicated, the opening 36 may accomodate a pump hanger, a gang valve or an outside filter for access to the interior of the aquarium, said parts being mounted either on the shelf 44 or upon the insert 108. The insert 108 is formed of relatively soft material which may be readily cut with a pair of scissors so as to provide openings, if required, for a heater thermostat, a filter or an air line hose, as may be required, and the thermostat and filter may, for example, be mounted on the shelf 44.

From the foregoing, it will be readily apparent that there has been provided a hood for an aquarium which hood is provided with a light source for the aquarium and is provided also with a hidden storage compartment 106 to accommodate various accessories for the aquarium and which compartment is provided with light by the very same light source which lights the aquarium.

While I have illustrated and described the presently preferred embodiment of my invention, it will be apparent that changes and modifications may be made therein without however departing from the spirit and scope of the invention as set forth in the appended claims.

I claim:

1. A hood comprising a frame member adapted to overlie substantially the entire open top of an aquarium, said frame member having a bottom flange which is substantially continuous throughout the periphery thereof, said flange having a depending portion adapted to sit on the rim of the aquarium, opposing end walls provided on said frame member and extending upwardly from opposite ends of said flange, a shelf extending between said end walls, said shelf and one side of said bottom flange defining an access opening, a first cover pivotally mounted by said end walls to close said access opening, and a second cover pivotally mounted by said end walls for movement between a closed position thereof overlying said shelf to an open position thereof exposing said shelf.

2. A hood as in claim 1, said first cover being movable from a closed position in which its inner surface overlies and faces said access opening to an open position in which its inner surface is exposed above said access opening, and means for mounting an electric light source on said inner surface.

3. A hood as in claim 1, said first cover having a depending flange which abuts said one side of said bottom flange in the closed condition of said first cover to define a side wall for said hood extending between said opposing end walls of said frame member.

4. A hood as in claim 1, pivot pins provided on said first cover and pivot openings for said pins defined in said end walls, said pivot openings being defined by a semi-circular opening defined in each end wall, and an insert retainer engaged on each end wall and provided with a semi-circular opening for registry with the semi-circular opening in the companion end wall.

References Cited in the file of this patent

UNITED STATES PATENTS 2,776,642  Sepersky _____ Jan. 8, 1957
3,018,758  Arnould _____ Jan. 30, 1962

FOREIGN PATENTS 853,981  Germany _____ Oct. 30, 1952